United States Patent
Van Der Velden

(10) Patent No.: US 12,408,749 B2
(45) Date of Patent: Sep. 9, 2025

(54) STORAGE SYSTEM

(71) Applicant: Bruynzeel Storage Systems, Panningen (NL)

(72) Inventor: Silvester Helena Gerardus Roland Van Der Velden, Panningen (NL)

(73) Assignee: Bruynzeel Storage Systems, Panningen (NL)

(*) Notice: Subject to any disclaimer, the term of this patent is extended or adjusted under 35 U.S.C. 154(b) by 957 days.

(21) Appl. No.: 17/465,935

(22) Filed: Sep. 3, 2021

(65) Prior Publication Data

US 2022/0079336 A1    Mar. 17, 2022

(30) Foreign Application Priority Data

Sep. 16, 2020   (NL) .................................... 2026479

(51) Int. Cl.
   *A47B 53/02*   (2006.01)
   *B65G 1/10*    (2006.01)
   (Continued)

(52) U.S. Cl.
   CPC ........... *A47B 53/02* (2013.01); *B65G 1/10* (2013.01); *F16P 3/142* (2013.01); *G06T 7/74* (2017.01);
   (Continued)

(58) Field of Classification Search
   CPC .............. A47B 53/02; G06T 7/74; G06T 2207/10004; G06T 2207/30232; B65G 1/10
   See application file for complete search history.

(56) References Cited

U.S. PATENT DOCUMENTS

| | | | | |
|---|---|---|---|---|
| 5,854,849 A | * | 12/1998 | Eaton | G01V 8/10 211/162 |
| 2006/0066188 A1 | * | 3/2006 | Crawford | A47B 51/00 312/247 |
| 2006/0145575 A1 | * | 7/2006 | Abrams | B60L 15/40 312/319.5 |

FOREIGN PATENT DOCUMENTS

| | | | | |
|---|---|---|---|---|
| CN | 106415164 A | * | 2/2017 | A23B 4/06 |
| EP | 0637714 A1 | * | 2/1995 | |

(Continued)

OTHER PUBLICATIONS

Chinese patent publication No. CN 106415164, "Cabinet System", Imam et al. (Year: 2017).*

(Continued)

*Primary Examiner* — Ernesto A Suarez
*Assistant Examiner* — Laurence R Brothers
(74) *Attorney, Agent, or Firm* — The Dobrusin Law Firm, P.C.

(57) ABSTRACT

Storage system, comprising a plurality of shelving units that are each driveably movable in a width direction wherein the storage system further comprises a safety system for determining whether movement is permitted, wherein the safety system comprises at least one camera, configured to provide an image of an interspace between a first shelving unit and a second shelving unit adjacent to the first shelving unit and a control device, for controlling the movement of the shelving units, and for executing a command if the first and second camera images show more than a predetermined amount of correspondence and ignoring the command if the first and the second camera images show more than a predetermined amount of deviation.

11 Claims, 2 Drawing Sheets

Figure 1:
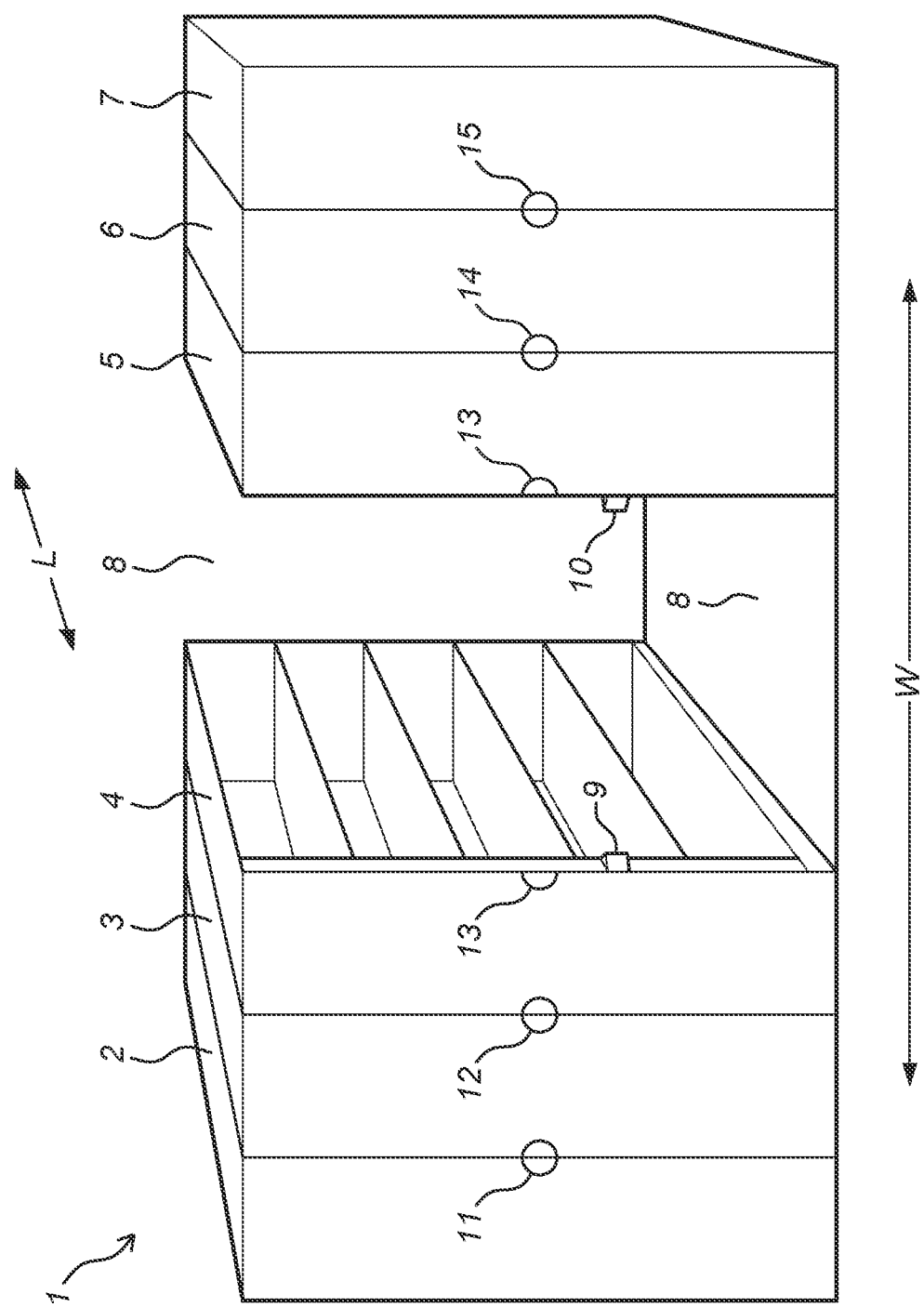

(51) Int. Cl.
*F16P 3/14* (2006.01)
*G06T 7/73* (2017.01)

(52) U.S. Cl.
CPC ............... *G06T 2207/10004* (2013.01); *G06T 2207/30232* (2013.01)

(56) References Cited

FOREIGN PATENT DOCUMENTS

| EP | 2407055 | A1 | | 1/2012 |
|----|---------|----|---|--------|
| JP | S5631711 | A | | 3/1981 |
| JP | H06255721 | A | * | 9/1994 |
| JP | 10215958 | A | * | 8/1998 |
| JP | H11113651 | A | | 4/1999 |
| JP | 2004035232 | A | * | 2/2004 |
| JP | 2007062929 | A1 | | 3/2007 |

OTHER PUBLICATIONS

European patent application No. EP 0637714, "Safety Mechanisms for Mobile Units", Jones, Kenneth (Year: 1995).*
Japanese patent publication No. JP 2004035232, "Shelf Facility", Hatanaka, Joji (Year: 2002).*
Japanese patent publication JP H10215958, "Motor-Driven Type Movable Rack", Miyazaki et al. (Year: 1998).*
Japanese patent publication No. JP H06255721, "Movable Rack Device", Hori, Ikuo (Year: 1994).*
Extended European Search Report dated Jun. 9, 2022, Application No. EP21192029.3.
Decision to Grant a European Patent dated Jun. 15, 2023, Application No. EP21192029.3.
Search Report & Written Opinion dated May 26, 2021, Application No. NL2026479.

* cited by examiner

STORAGE SYSTEM

The present invention relates to a storage system, in particular a storage system for archives, books or art storage, and more specific for the aforementioned purposes at an industrial scale.

Storage systems for this purpose are known in the art, for instance from the US patent publication US2006/145575, which describes a system comprising movable storage units, provided with a drive system in order to move them toward and from each other. In general, systems of this kind comprise a plurality of shelving units that extend parallel to each other in a longitudinal direction and are each driveably movable in a width direction, transverse to the longitudinal direction. This way, the position of each of the shelving units can be varied, or the interspace between two adjacent shelving units, or an aisle width and position between two adjacent shelving units. Especially the latter, changing the aisle width and position, is a beneficial property of this type of storage system.

Not only can a lot of space be saved, since effectively, the interspace of only one aisle is required, while in traditional storage systems with fixed shelving unit positions, interspace for an aisle needs to be available between every pair of adjacent shelving units in order to provide access, but also safety of the goods stored in the system can be guaranteed easier, since the head ends of the shelving units form a closed wall, preventing unallowed access to the stored goods, and facilitating the maintenance of special conditions, like light, humidity and temperature.

With the drive offering the advantage of controlled and controllable movement of the shelving units, it also introduces a possible risk, of including people and/or objects while automatically moving shelving units toward each other. This may cause harm to the storage system itself, but also to objects or persons in the aisle when the shelving units enclose them.

It is a goal of the present invention to provide a solution for the above mentioned disadvantage, and/or to provide a useful alternative to the state of the art.

The invention thereto proposes a storage system, comprising a plurality of shelving units that extend parallel to each other in a longitudinal direction; and are each driveably movable in a width direction, transverse to the longitudinal direction, for whether or not in dependence on each other varying the position of each of the shelving units, varying the interspace between two adjacent shelving units and/or varying an aisle width and position between two adjacent shelving units, wherein the storage system further comprises a safety system for determining whether movement is permitted, wherein the safety system comprises at least one camera, configured to provide an image of an interspace between a first shelving unit and a second shelving unit adjacent to the first shelving unit, wherein the safety system further comprises a control device, for controlling the movement of the shelving units, the control device being arranged for receiving images from one or more cameras, saving a first camera image of an interspace between the first and the second shelving unit, at the moment an interspace between the first and second shelving unit is being created or has been created, receiving a command to move the first and second shelving unit towards each other, capturing a second camera image from the same camera or cameras on or after the moment of receiving the command, comparing the first and the second camera image, executing the command if the first and second camera images show more than a predetermined amount of correspondence, ignoring the command if the first and the second camera images show more than a predetermined amount of deviation.

The images received and/or captured from the camera between the moment an interspace between the first and second shelving unit is being created or has been created and the moment of receiving a command to move the first and second shelving unit towards each other are may not be registered or even be ignored or discarded. By comparing the images from the moment the interspace between the first and second shelving unit is (being) created and the moment the command for moving the first and the second shelving toward each other, the situation between the shelving units when the aisle is just created is compared with the situation between the shelving units when the aisle is about to be closed. Any differences between those images indicate that a change has occurred, which may be caused by a person or object located in between the first and the second shelving unit, and thus indicate a possible danger. Differences that occur in between these moments and have disappeared at the moment the command is received do not unambiguously indicate possible danger, since they may be the effect of normal activities in the aisle. Ignoring these images leads to less data to be stored, and reduces the chance of wrongly ignoring a command to move shelving units toward each other.

The deviation between the images may be determined by comparing for instance pixels, area's, shapes, and/or colours into account, and based on image comparison algorithms. The threshold may take effects of shadows or changes in the items stored in the shelving units into account, as well as effects of changes in light intensity, in order to avoid wrongly ignoring a command to move shelving units toward each other. The system may be configured with artificial intelligence or similar means to be able to be trained in recognition of similarities and deviations or differences between images. Images do not necessarily need to be saved in the sense of stored onto a file system or a memory. Streaming image data may be processed in order to compare a situation between two storage units.

The control device may be or comprise one central unit, but it is also possible that multiple decentral units are applied. In particular it is possible that each camera is provided with or coupled to processing means, that process the camera image. This way, the combined camera and processing means for a device that may for instance provide a signal or data that indicates whether a storage unit may or may not be moved.

The shelving units according to the invention are preferably closed ad their head ends, so there is no access to the contents of shelvings but from the direction from the direction from (an aisle between) adjacent shelvings.

A close command may be provided remotely, via a remote control panel or generated automatically by a controller for instance when a certain time limit is reached, or it may be provided at the location of the shelving units, for instance via a user interface provided on the shelving unit. The closing command may in particular be the result of a command to create an interspace or an aisle between a different pair of shelvings of the system. Such command may also be referred to as an "opening command" and may be provided in the same way.

In a first embodiment, there is at least one camera provided for each pair of adjacent shelving units. The camera may be provided on either one of the adjacent shelving units.

In an embodiment each shelving unit is provided on its end side with at least one camera on a side adjacent to another shelving unit, wherein the at least one camera is designed to provide an image of the interspace between the respective shelving unit and the adjacent shelving unit. This allows to design and configure multiple shelving units identically.

The amount of camera's applied and their locations may be dependent on both properties of the camera and properties of the configuration of the storage system. When an aisle width exceeds the view range of a camera used, it may be decided to apply cameras on both shelving units.

Similar considerations apply to the length of the shelving units and the view range of the camera in a length direction. If the aisle length to be covered is bigger than the view length of the camera, cameras on both end sides of the aisle may be applied.

The same goes for the situation wherein an aisle is approachable from its two end sides. In that case, also camera's at two end sides of the aisle may be applied. Also the height at which a camera is positioned may be determined by camera view properties.

The cameras may be positioned, designed or oriented such that they provide an image of the floor surface of the interspace between adjacent shelving units. The floor surface is the most likely position for objects or persons to be or to be left.

In order to cover the entire floor surface or aisle area, the camera's are preferably positioned outside a shelving unit, since otherwise the shelving unit itself may always obstruct at least part of the view angle of the camera. On the other hand, to maximize the space reduction that can be obtained with the movable shelving units according to the invention, it may in general be a goal to be able to move the shelving units as close to each other as possible, and preferably next to each other and/or touching. For that purpose, in an embodiment the cameras are accommodated in a holder which is movably coupled to the shelving unit, between an ejected position in which the camera is located in a position in the interspace between the shelving unit and an adjacent shelving unit, and a retracted position, wherein the camera and the holder are located within the contour of the shelving unit for a larger part than in the first position, and preferably are at least largely within the contour of the shelving unit.

In a practical embodiment, the camera is accommodated in a support that is resiliently projecting from the shelving unit, which support can be at least partially retracted into the shelving unit, in particular in an end wall thereof, by moving the shelving unit against an adjacent shelving unit. The holder may for instance be biased or tensioned by a spring or the like. The storage system according to the invention may be configured such that in between shelving units or at least rigid edges thereof, safety zones are maintained, for instance with a minimum space of a finger, or about 25 mm.

In a further embodiment the storage system according to the invention comprises a control panel for providing a command for moving the first and second shelving unit towards each other, which control panel is arranged in particular on the shelving unit. The control panel may in its simplest form comprise a button, but a (touch) screen may also be an option. The panel may comprise indicators such as lights or sound generating devices to indicate its state or announce its movement. A more advanced user interface comprises a lever, that allows a user to indicate that a movement of a shelving unit in a certain direction is intended. A small rotation of the lever toward the direction of intended movement may then form an input for the control system.

The controller may further be configured for determining that a change takes place in an interspace between a first shelving unit and a second adjacent shelving unit, such as a person entering the interspace, during the displacement of a first shelving unit, based on a camera image. In this embodiment the camera is configured to register images between the moment an interspace between the first and second shelving unit is created and the moment wherein a command to move the first and second shelving unit towards each other is received. The images captured during this interval may then be continuously monitored by the controller, and any change between subsequent images or frames may be considered as an indication of a change of the actual situation in the interspace. In this configuration, additional sensors may be omitted.

In an alternative embodiment, the storage system comprises at least one sensor, adapted to provide a signal that indicates whether an object is located in an interspace between a first shelving unit and a second shelving unit adjacent thereto, in particular within a predetermined height with respect to a floor surface between the first shelving unit and the adjacent second shelving unit.

Contrary to the at least one camera, the sensor does not capture full images, but it does provide a continuous signal, that is, also when a first shelving unit and an adjacent second shelving unit are at a mutual position (and thus not against each other). The sensor signal gives an indication that anything happens during a movement of the shelving units. This sensor signal may be used to determine that people or objects move into or through aisles during a movement thereof. If movement is determined, this information may be used as a trigger for aisle inspection, and the camera images may be collected.

The at least one sensor is for instance a PIR (Passive Infra Red) sensor, arranged in the same housing as the camera. The sensor may have a range that extends over the entire length of an interspace or aisle between shelving units, in order to detect a person entering the aisle regardless of where the person touches the floor surface.

The controller may be configured for determining that a change takes place in an interspace between a first shelving unit and a second adjacent shelving unit, such as a person entering the interspace, during the displacement of a first shelving unit, based on the signal from the sensor.

The use of a separate sensor may be preferred over the use of the camera for this purpose, since image processing for determining a change of a situation in the aisle from images generated by a camera moving with the shelving unit may be rather complex, while in particular a PIR sensor may be easier to implement since the sensor is less or not sensitive for the movement of the shelving.

In a preferred embodiment, the invention relates to an integrated unit comprising a camera and a PIR sensor, provided with a controller for processing camera images and a sensor signal and providing a preferably binary output indicating whether or not an aisle adjacent to the position of the integrated unit may be closed by moving shelving units. Such integrated unit may be provided with a support that for resiliently projecting the integrated unit from a shelving unit, which support can be at least partially retracted into the shelving unit, in particular in an end wall thereof, together with the integrated unit itself.

In addition to the above, a photo cell at or just above floor level may be applied to determine people or objects present in the aisle, in particular upon closing an aisle.

In yet a further embodiment, the controller is configured for using a previously stored first camera image in case of a determined change, instead of storing a new first camera image for comparing the first and the second camera image. The detection of the change may indicate that a person has entered the interspace between two shelving units during the movement of the shelving units away from each other while creating an interspace or aisle. As a result, it is known up front that the images taken at the moment an interspace between the first and second shelving unit is created and the moment wherein a command to move the first and second shelving unit towards each other is received are different. By using a previously stored image a risk of false determinations of changes is reduced. The storage system according to the invention may be arranged for issuing a visible or audible or digital alarm signal in case the first and the second camera images show more than a predetermined amount of deviation.

The one or more cameras for providing an image of an interspace between a first shelving unit and an adjacent second shelving unit may be directed at a floor surface between a first shelving unit and an adjacent second shelving unit, and the viewing range of the one or more cameras may be limited in order to prevent changes outside the area between two shelving units leading to ignoring of a command and/or an alarm.

The shelving units of the storage system according to the invention may be provided with a drive, wherein the drive and/or controller is provided with a position control for moving a shelving unit to a desired position. The control may be of the type as described in US2006/145575 with a controller comprising an encoder for position control of the shelving units, or similar or alternative control systems for the position. The drive and the control system may be used to position a shelving unit on a predetermined position, but additionally, the system may be configured to continue controlling the position of a shelving unit once said position has been reached. This has the effect that as soon as a shelving unit is moved from its intended location, the control system directly controls the drive means to put the shelving unit back to its intended position. Such movement may for instance be the effect of unallowed attempt to enter the storage system. The controller may be configured to generate an alarm signal when a shelving unit is moved from its location while no command thereto is executed. The alarm signal may be processed in various ways: for instance an audible or visible alarm may be generated, or the alarm signal may be sent to a remote control location for initiating further follow up measures.

In another embodiment, the storage system according to the invention is configured for determining electric current flowing or an electric power consumed by the drive or a course thereof when executing the command to move a shelving unit, and to compare the electric currents flowing or the electric power consumed with a predetermined or expected electric current or electric power. If the actual current or power exceeds the predetermined value, this may be an indication of an obstruction present between the two adjacent shelving units. In order to avoid wrong determination of the presence of an obstruction due to a heavily loaded shelving unit, a course or gradient or change during the movement of the shelving unit may be determined. Such gradient or change or a divergent course from what is expected may indicate the presence of an obstruction in the path of a shelving unit and the controller may be configured to stop or cancel the execution of the command.

The invention also relates to a storage system, comprising a plurality of shelving units that extend parallel to each other in a longitudinal direction; and are each driveably movable in a width direction, transverse to the longitudinal direction, for whether or not in dependence on each other varying the position of each of the shelving units, varying the interspace between two adjacent shelving units and varying an aisle width and position between two adjacent shelving units; wherein the storage system further comprises a safety system for determining whether movement is permitted, wherein the safety system comprises a control device, for controlling the movement of the shelving units, the control device being arranged for receiving a command to move the first and second shelving unit towards each other, executing the command as long as at least one of the shelving units has not reached an intended position; and once all shelving units are at their intended positions, keeping track of the actual positions of all shelving units; and as soon as the position of one of the shelving units changes, again executing the command as long as at least one of the shelving units has not reached an intended position. When the command is executed again, an alarm of the above described type may be triggered.

Figure 2:
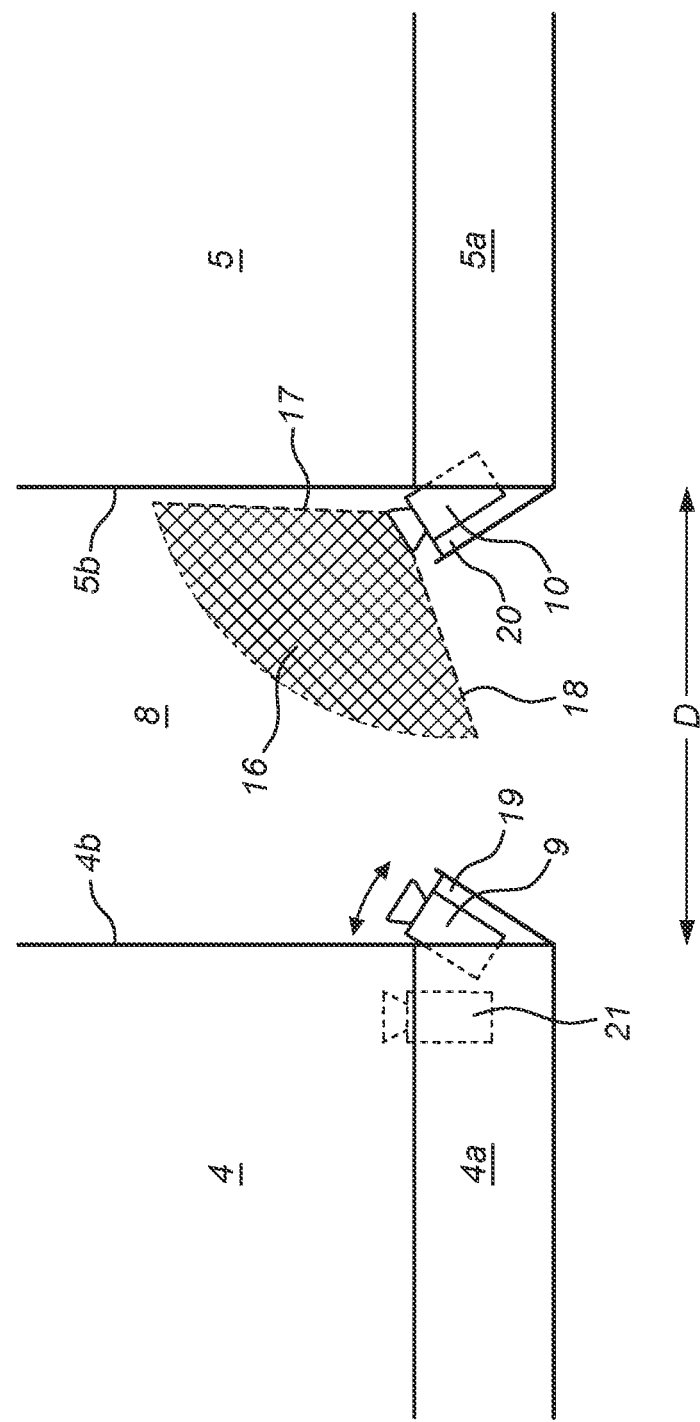

The invention will now be elucidated into more detail with reference to the following figures, wherein:

FIG. 1 shows a perspective view of a storage system according to the present invention; and FIG. 2 shows a sectional view of a detail of the present invention.

FIG. 1 shows a perspective view of a storage system 1 according to the present invention. The system 1 comprises a plurality of shelving units 2-7 that extend parallel to each other in a longitudinal direction L and are each driveably movable in a width direction W, transverse to the longitudinal direction L, for whether or not in dependence on each other varying the position of each of the shelving units 2-7, varying the interspace 8 between two adjacent shelving units (in the case shown shelving units 4 and 5; and varying an aisle 8 width and position between two adjacent shelving units, wherein the storage system further comprises cameras (only cameras 9 and 10 are visible), configured to provide an image of an interspace 8 between a first shelving unit 4 and a second shelving unit 5 adjacent to the first shelving unit 4 and a control device (not visible), for controlling the movement of the shelving units, the control device being arranged for receiving images from one or more cameras 9, 10, saving a first camera image of an interspace 8 between the first and the second shelving unit 4, 5, at the moment an interspace between the first and second shelving unit is or has been created; receiving a command, for instance from a user interface 11, 12, 13, 14 or 15 to move the first and second shelving unit 4, 5 towards each other, capturing a second camera image from the same camera or cameras 9, 10 on or after the moment of receiving the command, comparing the first and the second camera image, executing the command if the first and second camera images show more than a predetermined amount of correspondence, and ignoring the command if the first and the second camera images show more than a predetermined amount of deviation.

FIG. 2 shows a detail from the storage system 1 from FIG. 1. Each shelving unit is provided on its end side with at least one camera (9 and 10 depicted) on each side adjacent to another shelving unit, wherein the cameras 9, 10 are designed to provide an image of the interspace 8 between the respective shelving unit 4 and the adjacent shelving unit 5.

FIG. 2 shows a range of view 16 of camera 10, which extends between borders 17 and 18. Camera 9 has a similar view range, wherein the view ranges may at least partially overlap, depending on the distance D between the shelving units 4, 5. The cameras are accommodated in a holder 19, 20 which is movably coupled to the shelving unit, in particular in a head end or end wall 4a, 5a thereof, between an ejected position (shown) in which the camera 9, 10 is located in a position in the interspace 8 between the shelving unit 4 and an adjacent shelving unit 5, and a retracted position, shown dashed 21 for camera 9, wherein the camera 9, 10 and the holder 19, 20 are located within the contour of the shelving unit for a larger part than in the first position, and preferably are at least largely within the contour of the shelving unit. In this view, the contour is formed by or comprises the edge 4b, 5b of the shelvings 4, 5. The holders 19, 20 may be resiliently (for instance by means of a spring) projecting from the shelving unit, which support can be at least partially retracted into the shelving unit, in particular in an end wall or head end 4a, 5a thereof, by moving the shelving unit 4 against an adjacent shelving unit 5.

The above examples are exemplary only and do not limit the scope of the invention as defined by the following claims.

The invention claimed is:

1. Storage system, comprising:
   a plurality of shelving units that:
   extend parallel to each other in a longitudinal direction (L); and
   are each driveably movable in a width direction (W), transverse to the longitudinal direction, regardless of dependence on each other:
   varying the position of each of the shelving units;
   varying the interspace between two adjacent shelving units; and
   varying an aisle width and position between two adjacent shelving units;
   wherein the storage system further comprises:
   a safety system for determining whether movement is permitted, wherein the safety system:
   comprises at least one camera, configured to provide an image of an interspace between a first shelving unit and a second shelving unit adjacent to the first shelving unit;
   A control device, for controlling the movement of the shelving units, the control device being arranged for:
   Receiving images from one or more cameras;
   Saving a first camera image of an interspace between the first and the second shelving unit, at the moment an interspace between the first and second shelving unit is or has been created;
   Receiving a command to move the first and second shelving unit towards each other;
   Capturing a second camera image from the same camera or cameras on or after the moment of receiving the command;
   Comparing the first and the second camera image;
   Executing the command if the first and second camera images show more than a predetermined amount of correspondence;
   Ignoring the command if the first and the second camera images show more than a predetermined amount of deviation;
   comprising at least one sensor, adapted to provide a signal that indicates whether an object is located in an interspace between a first shelving unit and a second shelving unit adjacent thereto; wherein the sensor is configured to provide a continuous signal but not to capture full images, the signal used to determine if movement is determined, if movement is detected then a trigger for aisle inspection to collect images from the camera or cameras is made; and
   wherein the controller is configured for determining that a change takes place in an interspace between a first shelving unit and a second adjacent shelving unit, such as a person entering the interspace, during the displacement of a first shelving unit, based on the signal from the sensor.

2. Storage system according to claim 1, wherein each shelving unit is provided on its end side with at least one camera on a side adjacent to another shelving unit, wherein the at least one camera is designed to provide an image of the interspace between the respective shelving unit and the adjacent shelving unit.

3. Storage system according to claim 1, wherein the cameras are accommodated in a holder which is movably coupled to the shelving unit, between an ejected position in which the camera is located in a position in the interspace between the shelving unit and an adjacent shelving unit, and a retracted position, wherein the camera and the holder are located within the contour of the shelving unit for a larger part than in the first position.

4. Storage system according to claim 1, wherein the camera is accommodated in a support that is resiliently projecting from the shelving unit, which support can be at least partially retracted into the shelving unit, in particular in an end wall thereof, by moving the shelving unit against an adjacent shelving unit.

5. Storage system according to claim 1, comprising a control panel for providing a command for moving the first and second shelving unit towards each other, which control panel is arranged in particular on the shelving unit.

6. Storage system according to claim 1, wherein the at least one sensor is a PIR sensor.

7. Storage system according to claim 1, wherein the controller is configured for determining that a change takes place in an interspace between a first shelving unit and a second adjacent shelving unit, such as a person entering the interspace, during the displacement of a first shelving unit, based on a camera image.

8. Storage system according to claim 1, wherein the controller is configured for using a previously stored first camera image in case of a determined change, for comparing the first and the second camera image.

9. Storage system according to claim 1, arranged for issuing a visible or audible or digital alarm signal.

10. Storage system according to claim 1, wherein the one or more cameras for providing an image of an interspace between a first shelving unit and an adjacent second shelving unit are directed at a floor surface between a first shelving unit and an adjacent second shelving unit.

11. Storage system according to claim 10, wherein the viewing range of the one or more cameras is limited in order to prevent changes outside the area between two shelving units leading to ignoring of a command and/or an alarm.

* * * * *